United States Patent
Scholz

(10) Patent No.: US 10,230,592 B2
(45) Date of Patent: Mar. 12, 2019

(54) COMPOUND SERVICE PERFORMANCE METRIC FRAMEWORK

(71) Applicant: Oracle International Corporation, Redwood Shores, CA (US)

(72) Inventor: Hendrik Scholz, Berlin (DE)

(73) Assignee: Oracle International Corporation, Redwood Shores, CA (US)

( * ) Notice: Subject to any disclaimer, the term of this patent is extended or adjusted under 35 U.S.C. 154(b) by 281 days.

(21) Appl. No.: 15/059,038

(22) Filed: Mar. 2, 2016

(65) Prior Publication Data

US 2017/0257285 A1   Sep. 7, 2017

(51) Int. Cl.
*H04L 12/24* (2006.01)
*H04L 12/26* (2006.01)

(52) U.S. Cl.
CPC .......... *H04L 41/5032* (2013.01); *H04L 43/04* (2013.01)

(58) Field of Classification Search
CPC ..... H04L 41/5032; H04L 43/04; H04L 43/50; H04L 43/0876; H04L 65/80; H04L 67/16; H04L 41/5067; G06F 17/30707
See application file for complete search history.

(56) References Cited

U.S. PATENT DOCUMENTS

| | | | |
|---|---|---|---|
| 5,644,754 A * | 7/1997 | Weber | G06F 13/378 703/24 |
| 6,012,096 A * | 1/2000 | Link | H04L 29/06 709/233 |
| 6,801,940 B1 * | 10/2004 | Moran | H04L 47/10 370/230 |
| 7,702,351 B2 * | 4/2010 | Soliman | H04W 52/24 370/318 |
| 7,990,854 B1 * | 8/2011 | Huang | G06F 17/30861 370/229 |
| 8,140,540 B2 * | 3/2012 | Chitiveli | G06F 17/30707 707/748 |
| 9,111,281 B2 * | 8/2015 | Stibel | G06Q 30/018 |
| 9,141,947 B1 * | 9/2015 | Furr | G06Q 20/102 |
| 9,384,203 B1 * | 7/2016 | Seiver | G06F 17/40 |
| 9,438,939 B2 * | 9/2016 | Wright | H04N 21/845 |
| 9,495,143 B2 | 11/2016 | Mellor et al. | |
| 9,553,990 B2 | 1/2017 | Sloan et al. | |

(Continued)

*Primary Examiner* — Viet D Vu
(74) *Attorney, Agent, or Firm* — Kraguljac Law Group, LLC

(57) ABSTRACT

Techniques described herein include determining, maintaining, and applying compound service performance metrics, based on data metrics from a plurality of different services. Service-specific data metrics may be received from a plurality of different communication services offered by a service provider, for example, Internet service, voice service, video service, SMS service, etc. Different combinations, relationships, and weighting factors for the data metrics may be defined and stored for each compound performance metric. Compound performance metrics may be defined, including for example, compound customer sentiment metrics, compound customer value metrics, and/ or compound customer resource usage metrics. In some cases, machine-learning and/or analytics may be performed using service-specific data metrics and corresponding customer actions, in order to determine correlations between particular combinations of data metrics and customer actions.

20 Claims, 9 Drawing Sheets

(56) References Cited

U.S. PATENT DOCUMENTS

| | | | |
|---|---|---|---|
| 9,632,991 B2 | 4/2017 | Straub et al. | |
| 9,729,718 B2 | 8/2017 | Chan et al. | |
| 9,792,020 B1* | 10/2017 | Kelley | G06F 3/04842 |
| 9,842,313 B2 | 12/2017 | B'far et al. | |
| 9,871,694 B1* | 1/2018 | Walavalkar | H04L 41/0803 |
| 2003/0225549 A1* | 12/2003 | Shay | H04L 41/5009 |
| | | | 702/182 |
| 2004/0128673 A1* | 7/2004 | Fuchs | G06F 9/542 |
| | | | 719/310 |
| 2004/0136327 A1* | 7/2004 | Sitaraman | H04L 43/00 |
| | | | 370/252 |
| 2006/0250988 A1* | 11/2006 | Garcia | H04L 29/06027 |
| | | | 370/260 |
| 2007/0201425 A1* | 8/2007 | Smith | G06N 7/00 |
| | | | 370/351 |
| 2008/0056153 A1* | 3/2008 | Liu | H04L 41/5022 |
| | | | 370/252 |
| 2008/0232269 A1* | 9/2008 | Tatman | H04L 43/12 |
| | | | 370/252 |
| 2009/0064248 A1* | 3/2009 | Kwan | H04L 12/1868 |
| | | | 725/109 |
| 2009/0109879 A1* | 4/2009 | Kuusinen | H04L 12/1822 |
| | | | 370/260 |
| 2009/0141634 A1* | 6/2009 | Rothstein | H04L 47/10 |
| | | | 370/236 |
| 2009/0307400 A1* | 12/2009 | Machauer | H04L 12/403 |
| | | | 710/110 |
| 2010/0191563 A1* | 7/2010 | Schlaifer | G06Q 10/06 |
| | | | 705/7.36 |
| 2010/0235367 A1* | 9/2010 | Chitiveli | G06F 17/30707 |
| | | | 707/752 |
| 2011/0136478 A1* | 6/2011 | Trigui | H04W 24/02 |
| | | | 455/418 |
| 2012/0089606 A1* | 4/2012 | Eshwar | G06F 17/30707 |
| | | | 707/737 |
| 2012/0311126 A1* | 12/2012 | Jadallah | H04L 41/5067 |
| | | | 709/224 |
| 2013/0003800 A1* | 1/2013 | Finkelstein | H04N 21/23418 |
| | | | 375/224 |
| 2013/0218792 A1* | 8/2013 | Gorti | G06Q 30/02 |
| | | | 705/319 |
| 2013/0291000 A1* | 10/2013 | Wright | H04H 60/64 |
| | | | 725/19 |
| 2013/0329595 A1* | 12/2013 | Scholz | H04L 65/80 |
| | | | 370/252 |
| 2014/0089504 A1* | 3/2014 | Scholz | H04L 41/5032 |
| | | | 709/224 |
| 2014/0094210 A1* | 4/2014 | Gellens | H04W 4/90 |
| | | | 455/517 |
| 2014/0165207 A1* | 6/2014 | Engel | H04L 63/1425 |
| | | | 726/25 |
| 2014/0226521 A1* | 8/2014 | Jilani | H04L 47/2416 |
| | | | 370/253 |
| 2014/0317288 A1* | 10/2014 | Krueger | H04L 41/5025 |
| | | | 709/224 |
| 2015/0046233 A1* | 2/2015 | Srulowitz | G06Q 10/06398 |
| | | | 705/7.42 |
| 2015/0073929 A1* | 3/2015 | Psota | G06Q 50/28 |
| | | | 705/26.2 |
| 2015/0180759 A1* | 6/2015 | Fallon | H04L 41/5009 |
| | | | 709/224 |
| 2015/0215458 A1* | 7/2015 | Meng | H04M 3/5166 |
| | | | 379/88.01 |
| 2015/0371256 A1* | 12/2015 | Shah | G06Q 30/0242 |
| | | | 705/14.41 |
| 2016/0306806 A1* | 10/2016 | Fackler | G06F 17/3056 |
| 2017/0017908 A1* | 1/2017 | Bracher | G06Q 10/0635 |
| 2017/0286191 A1* | 10/2017 | Israeli | G06F 9/542 |

* cited by examiner

COMPOUND SERVICE PERFORMANCE METRIC FRAMEWORK

BACKGROUND

Network operators and communication service providers may offer a multitude of services, such voice services, video services, and data services, as well as Short Message Service (SMS), gaming, music/movie streaming, home monitoring, Internet of Things (IoT), and other such services. In many cases, service providers may offer various bundled service packages to customers, such as a combination phone service, Internet service, and television service via a fixed-line telephone network, a cable/or satellite broadcast infrastructure, and/or communication networks. Additional services such as Over-The-Top (OTT) offerings also may be bundled to cater to specific customer groups. Network operators and/or communication service providers may bundle various different subsets of their offerings which may be targeted for specific customers or customer groups. Customers subscribing to such service bundles may use some or all of the bundled services, and may have different behaviors and usage patterns with respect to their different services. Subscribers also may interact with each service through various different points of contact, including support systems, activation systems, financial systems, and through direct usage of the services themselves.

SUMMARY

Aspects described herein provide various techniques for determining, maintaining, and applying compound service performance metrics, based on data metrics from a plurality of different services. Compound service metrics may include both service-aware and/or service-agnostic metrics, each of which may be defined as a distinct combination of and/or relationship between a number of service data metrics. In some embodiments, data metrics may be received from a plurality of different communication services and/or data sources offered by a single service provider, for example, Internet service, voice service, video service, SMS service, etc. Different combinations, relationships, and weighting factors for the data metrics may be defined and stored for each compound performance metric. Compound performance metrics may include, for example, compound customer sentiment metrics, compound customer value metrics, and/or compound customer resource usage metrics. In some cases, compound service metrics also may include lower level compound service metrics, for example, individual signaling and media compound metrics discussed in examples below, which may be used to create a higher level compound metrics. Additionally, the compound signaling metrics (e.g. voice signaling, video signaling, video streaming signaling) may be combined into a more network OSS/BSS style metrics. In some embodiments, machine-learning and/or analytics may be performed using service data metrics and corresponding customer actions, in order to determine subsets of the data metrics, relationships between the data metrics, and/or data metric weighting factors to use for compound service performance metrics.

After defining one or more compound performance metrics, individual customer values may be calculated for the compound metrics. For example, an operator of a communication service system may request generation of one or more compound performance metrics for an individual customer or group of customers. In response, customer-specific sets of data metrics may be retrieved, including data metrics from individual services, other point of contact systems, and/or other third-party data sources such as network monitor systems. The compound customer metrics may be calculated based on the individual service data metrics, using the compound metric definitions, relationships, and weighting factors. In some cases, service-agnostic compound metrics may be drilled down into one or more service-aware compound metrics. The resulting compound service performance metric values for a customer or group of customers may be transmitted back to individual services/systems, and/or used to predict service usage patterns and customer behaviors, generate customized offers, etc.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
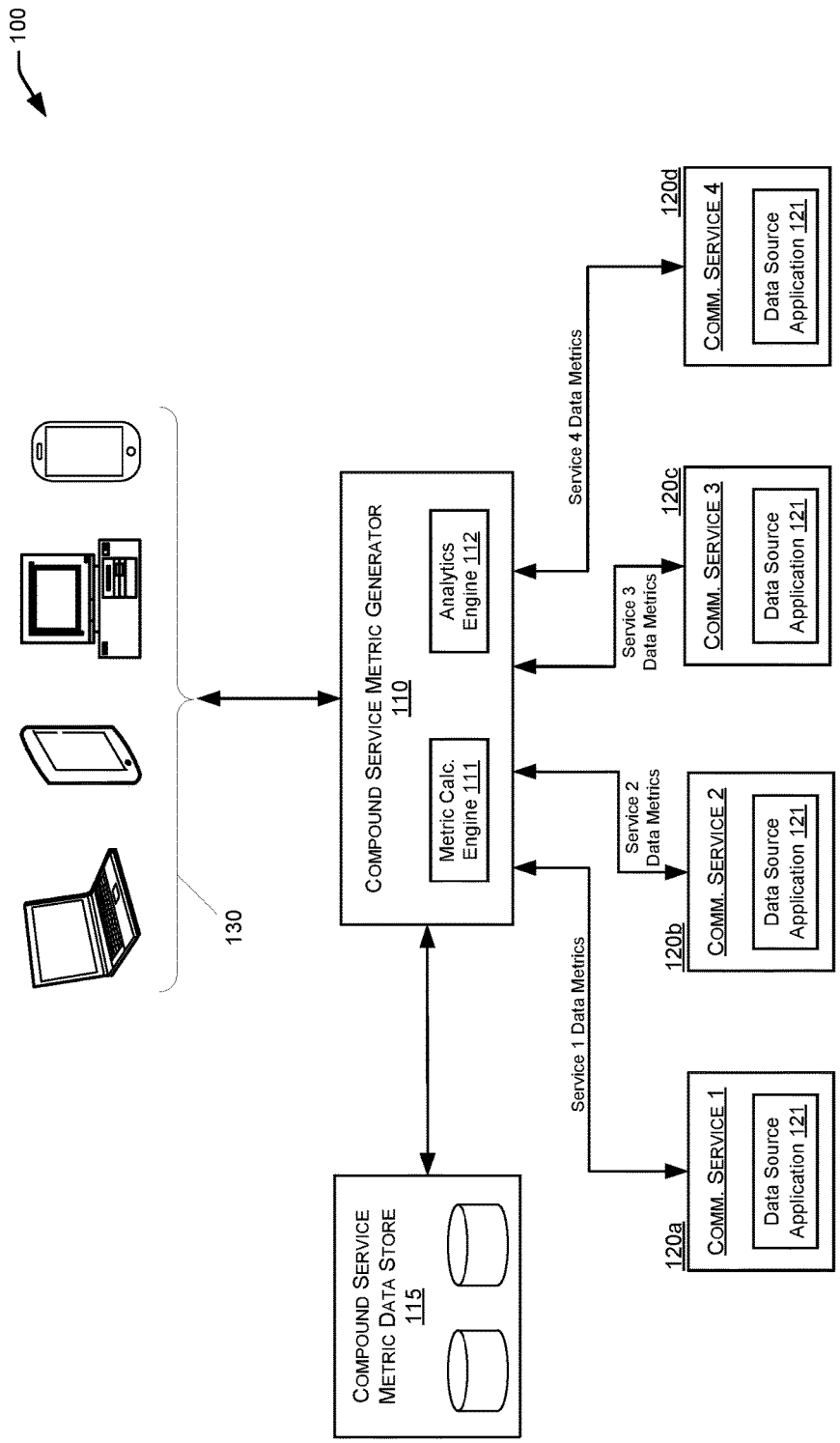
FIG. 1 illustrates an example of a system for defining and generating compound service metrics, in accordance with one or more embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Various techniques (e.g., systems, methods, computer-program products tangibly embodied in a non-transitory computer-readable storage medium, etc.) are described herein for determining, maintaining, and applying compound service performance metrics, based on data metrics from a plurality of different services. Compound service metrics may include both service-aware and/or service-agnostic metrics, each of which may be defined as a distinct combination of and/or relationship between a number of service data metrics. In some embodiments, data metrics may be received from a plurality of different communication services offered by a single service provider, for example, Internet service, voice service, video service, SMS service, etc. Different combinations, relationships, and weighting factors for the data metrics may be defined and stored for each compound performance metric. Compound performance metrics may include, for example, compound customer sentiment metrics, compound customer value metrics, and/or compound customer resource usage metrics. In some cases, machine-learning and/or analytics may be performed using service data metrics and corresponding customer actions, in order to determine subsets of the data metrics, relationships between the data metrics, and/or data metric weighting factors to use for compound service performance metrics.

After defining one or more compound performance metrics, individual customer values may be calculated for the compound metrics. For example, an operator of a communication service system may request generation of one or more compound performance metrics for an individual customer or group of customers. In response, customer-specific sets of data metrics may be retrieved, including data metrics from individual services, other point of contact systems, and/or other third-party data sources such as network monitor devices and systems. The compound customer metrics may be calculated based on the individual service data metrics, using the compound metric definitions, relationships, and weighting factors. In some cases, service-agnostic compound metrics may be drilled down into one or more service-aware compound metrics. The resulting compound service performance metric values for a customer or group of customers may be transmitted back to individual services/systems, and/or used to predict service usage patterns and customer behaviors, generate customized offers, etc.

Thus, the various techniques described herein may provide a single metric or combination of metrics used to calculate customer resource usage, customer value, customer sentiment, etc., a on a per customer basis. Compound service performance metrics may be used in different contexts to perform further analytics by service providers and/or third-party systems, in ad-hoc and automated processes, relating to customer churn predictions, targeted offers, campaign analysis (e.g., pre- and post-campaign), loyalty management, brand promotion, and customer cost/revenue analysis, etc. In some cases, such data may be shared among different business units of the same company, and/or sold or shared with third parties.

FIG. 1 illustrates an example of a system 100 for defining and generating compound service metrics based on data received from a plurality of communication services. As shown in FIG. 1, system 100 may include a compound service metric generator 110 communicatively coupled to a number of services 120, and one or more client devices 130. As discussed below, in some embodiments, the compound service metric generator 110 may receive transmissions of various data metrics (e.g., service-specific and/or system-specific data metrics) from the various source applications/systems of the services 120. The received data metrics may be stored in a compound service metric data store 115 which may operate independently or may be implemented within/integrated into the compound service metric generator 110. Compound service metric data store 115 may include multiple data sources in some cases, including relationship databases and/or big data (e.g., HADOOP) storage structures, and it should be understood that the system may be agnostic to the actual data store 115. New compound service metrics may be defined by operators via client devices 130, via applications/systems of services 120, and/or using an analytics engine 112, and the compound service metric definitions may be stored locally at the compound service metric generator 110 and/or in the data store 115. The compound service metric generator 110 may use the definitions to calculate values for the compound service metrics for individual customers and/or groups of customers, and these values may be transmitted to client devices 130, returned to services 120, and/or used for further analysis or various automated tasks performed by service providers and/or third-party systems.

In order to perform these features and the additional functionality described below, each of the components and sub-components shown in example system 100, such as compound service metric generator 110, the compound service metric data store 115, services 120, and client devices 130 may correspond to a single computing device or server, or to a complex computing system including a combination of computing devices, storage devices, network components, etc. Each of these components and their respective subcomponents may be implemented in hardware, software, or a combination thereof. The components shown in system 100 may reside in on premise systems and/or cloud-based systems, and may communicate via various different communication networks, either directly or indirectly, by way of various intermediary network components, such as Internet Protocol (IP) network components including routers, gateways, firewalls, and the like, telecommunication network components, cable or satellite network components, etc. Although these physical network components have not been shown in this figure so as not to obscure the other elements depicted, it should be understood that any of the network hardware components and network architecture designs may be implemented in various embodiments to support communication between the compound service metric generator 110, service systems 120, and other components within the system 100.

Compound service metric generator 110 may be implemented as a single computing server, or a computing system including a combination of multiple computing devices, storage devices, network components, etc. In various embodiments, generator 110 may include various specialized hardware, software, and/or network components for receiving, integrating, and analyzing data metrics from service systems 120, interacting with client devices 130, and defining and calculating compound service metrics. For example, generator 110 may include one or more network interface components for communicating with data store(s) 115, service systems 120, and/or client devices 130. The compound service metric generator 110 also may include a metric calculation engine 111 and/or an analytics engine 112, one or both of which may include dedicated and/or specialized processors (e.g., dedicated integrated circuits and/or application-specific integrated circuits (ASICs)) configured to define, maintain, and calculate compound service metrics based on data received from services 120. As used herein, compound service metrics may include one or more metrics computed by the generator 110 based on data from multiple different services 120, in contrast to service-specific data metrics which may be based on combinations of data metrics received from a single service 120.

In some embodiments, data metrics received from systems and/or applications of services 120 may be stored in a compound service metric data store 115. Compound service metric data store 115 may include one or more internal data stores and/or external data stores (e.g., external storage systems, database servers, file-based storage, cloud storage systems, etc.) configured to receive, integrate, and store various different data metrics from various different service systems 120. In some embodiments, such data stores may reside in a back-end server farm, storage cluster, and/or storage-area network (SAN). The generator 110 and/or data store 115 also may include one or more network interface components, as well as programmatic or graphical user interfaces (e.g., software services, application programming interfaces, etc.) to facilitate communication between the generator 110, data store 115, and various service systems 120.

For certain examples and implementations, the compound service metric data store 115 may be a prebuilt data warehouse which may be designed and/or tuned specifically to store and maintain data metrics from a variety of services 120. For example, data store 115 may implement a TM Forum Information Framework (SID) standard, and may include a third-normal form schema. Data store 115 may include prebuilt Online Analytical Processing (OLAP) cubes and/or prebuilt data mining models for processing and analyzing the data metrics received from services 120, along with metadata and advanced predictive analytics. For analytics purposes, the data store 115 may include support for various big data technologies (e.g., Hadoop, Exadata, etc.). In some embodiments, the compound service metric data store 115 may support a multi-layer architecture (not shown in FIG. 1) with separate data foundation layers, data analytics layers, and/or data presentation layers. In such embodiments, a foundation layer of the data store 115 may include a third-normal form schema configure to manage data from any number of different source applications 121, thereby creating a single unified database from the separate data sources 121 of services 120. When the data store 115 includes an analytics layer, the data store 115 may automatically populate OLAP cubes and/or star schema models at the analytics layer, based on the data stored at the foundation layer. The data store 115, in various embodiments, also may include support for data mining models such as churn prediction, segmentation based on services 120 and/or customers, etc.

As shown in the example of FIG. 1, services 120 may correspond to communication services. Such communication services 120 may be implemented as computer servers and/or systems corresponding to the various different communication services offered by a single communication services provider (and/or multiple related communication services providers). Such communication services 120 may include voice services (e.g., telephone), data services (e.g., Internet service), and video services (e.g., television), as well as additional services such as SMS services, gaming services, music/movie streaming services, home monitoring services, and the like. Additionally or alternatively, services 120 may correspond to different customer points of contact with the provider of services 120, including support systems, service activation systems, account and/or finance systems, and the like. In other embodiments, the services 120 need not be communication services, but instead may correspond to any other type of multiple services provided a common service provider (or related service providers). For instance, in various embodiments, services 120 may correspond to different cloud offerings from a cloud services provider (e.g., a cloud-based data storage service, cloud-based processing service, cloud-based hosting service, cloud-based network and/or software offerings, etc.). In still other embodiments, the services 120 may correspond to different hardware/software components offered by a provider of an aggregated computing infrastructure. For instance, some service providers may allow customers to select and configure various combinations of computing infrastructure resources which are supported by multiple interactive hardware and/or software systems. In such examples, these selectable/optional components may include including computer servers and storage devices, virtual machine servers, operating systems, databases, middleware, and user application software, and each of these components may correspond to a different service 120 having a different computing infrastructure and/or different points of customer contact or interactions. In further examples, the services 120 may correspond to multiple different home utilities offered by a utilities service provider, or any other multitude of services provided by a single service provider.

As shown in this example, services 120 may include one or more data source applications 121 configured to transmit service-specific data metrics to the compound service metric generator 110 and/or data store 115. Such source applications 121 may include client-server applications, standalone applications, background processes, or the like, and may include one or more database interfaces, programmatic interfaces (APIs), and/or streaming analytics interfaces for transmitting the service-specific data metrics. Different communication services 120, or other types of services 120 in other embodiments, may use the same or different communication networks, the same or different data encoding and transmission techniques for data metrics, the same or different data transmission formats, data structures, etc. Additionally, different communication services 120, even those provided by the same service provider, may be implemented using many different computing infrastructures, including legacy hardware services, software services, storage services, and network services, combined with corresponding newly-implemented services. Moreover, the various services, systems and data source applications 121 of services 120 may be provisioned, deployed, and configured individually at different times, and such services 120 may operate in different data centers and/or different geographic locations. Accordingly, the compound service metric generator 110 and data store 115 may be configured to receive data from these various different types of services 120, including using different communication techniques and protocols, and to integrate the various data types/formats into a common storage system at the data store 115.

The individual data metrics collected and transmitted by the various service systems 120 may include service performance data, network data, resource usage data, customer experience data, and the like. In some cases, these service data metrics may include private and/or confidential data, such as data relating to customer accounts or customer usage of services, data relating to network or system performance of services 120, etc. Accordingly, service systems 120, generator 110, and/or data store 115 each may include the necessary hardware and software components to establish secure network interfaces and securely transmit and receive various types of data metrics. Some or all of the devices or services in system 100 may include security features and/or specialized hardware (e.g., hardware-accelerated TLS and HTTPS, WS-Security, firewalls, etc.) in order to transmit/receive various secure data metrics, and to prevent hacking and other malicious access attempts within the system 100.

In some cases, the components within system 100 may transmit individual service data metrics, compound service metrics and/or other data using secure data transmission protocols and/or encryption for data transfers, for example, File Transfer Protocol (FTP), Secure File Transfer Protocol (SFTP), and/or Pretty Good Privacy (PGP) encryption. Service-based implementations of the system 100 may use, for example, the Secure Sockets Layer (SSL) or Transport Layer Security (TLS) protocol to provide secure connections between the service systems 120, compound service metric generator 110, data store 115, and/or client devices 130. SSL or TLS may use HTTP or HTTPS to provide authentication (e.g., two-factor authentication) and to provide confidentiality.

Client devices 130 may include mobile devices such as smartphones, tablet computers, personal digital assistants, and wearable computing devices. Mobile client devices 130 may run a variety of mobile operating systems, and may be enabled for Internet, e-mail, short message service (SMS), Bluetooth®, mobile radio-frequency identification (M-RFID), and/or other communication protocols. Other client devices 130 may be general purpose personal computers or special-purpose computing devices including, by way of example, personal computers, laptop computers, workstation computers, and the like. Additionally, client devices 130 may be any other electronic devices, such as a thin-client computers, business or home appliances, and/or personal messaging devices, capable of communicating with the compound service metric generator 110 and/or other systems via various communications network(s) and protocols. In some embodiments, various user access permissions and roles may be defined via client applications using client devices 130. For example, multi-tenancy (e.g., allowing multiple network operators to leverage the same infrastructure for cloud deployments or other wholesale deployments) may be used. In some cases, roles may be application-specific roles defined by a service provider of a plurality of services 120, the compound service data metric generator 110, and/or other entities. Such roles and user access permissions may be enforced at the client devices 130, generator 110, and/or services 120, to determine, e.g., data metric and compound data metric access rights, compound data metric modification or execution rights, and/or other secure features of actions performed by users in the system 100. Additionally, as discussed below, client devices 130 may include software application(s) (e.g. web-based or stand-alone applications) configured to invoke the components of and interfaces provided by the compound service metric generator 110 (e.g., user interfaces, programmatic interfaces, etc.), in order to allow operators to define and create new compound service metrics, and to calculate values for compound service metrics for customers. Thus, client devices 130 may contain components that support communications with other devices, such as wireless transceivers and wireless communications interfaces, Ethernet sockets or other Local Area Network (LAN) interfaces, etc. In some implementations, client devices 130 may use security features and/or specialized hardware (e.g., hardware-accelerated TLS and HTTPS, WS-Security, firewalls, etc.) to communicate with generator 110 and/or other systems.

The compound service metric generator 110, compound service metric data store 115, various services 120, and/or client devices 130 may communicate over various different communication networks. For example, in some cases, generator 110 may receive individual service metric data from service source applications 121 via Internet Protocol (IP) network, which may use the Internet networking model and/or communication protocols, or other computer network. Such IP networks may include local area networks (LANs), wide area networks (WANs) (e.g., the Internet), and/or various cellular or telecommunication networks (e.g., 3G, 4G or EDGE (enhanced data rates for global evolution), WiFi (IEEE 802.11 family standards, or other mobile communication technologies), or any combination thereof. In other examples, different communication services 120 may communicate using different network types and protocols. For instance, the source application(s) 121 of a voice service 120 may transmit its data metrics to generator 110 via a telecommunication/voice network, while the source application 121 of a video/television service 120 may transmit data metrics over a cable network infrastructure or satellite network infrastructure, and so on. Thus, in different cases, service systems 120 may correspond to backend computer servers, satellite hubs, cable headends, interactive voice response (IVR) systems, etc. Furthermore, as noted above, various different implementations of the above communication networks and techniques may include secure or non-secure networks and transmission techniques in different examples. Additionally, certain of these communications may be internal to the data store 115 (e.g. inside one or more OCDM instances), and thus need not use IP-based communications.

Figure 2:
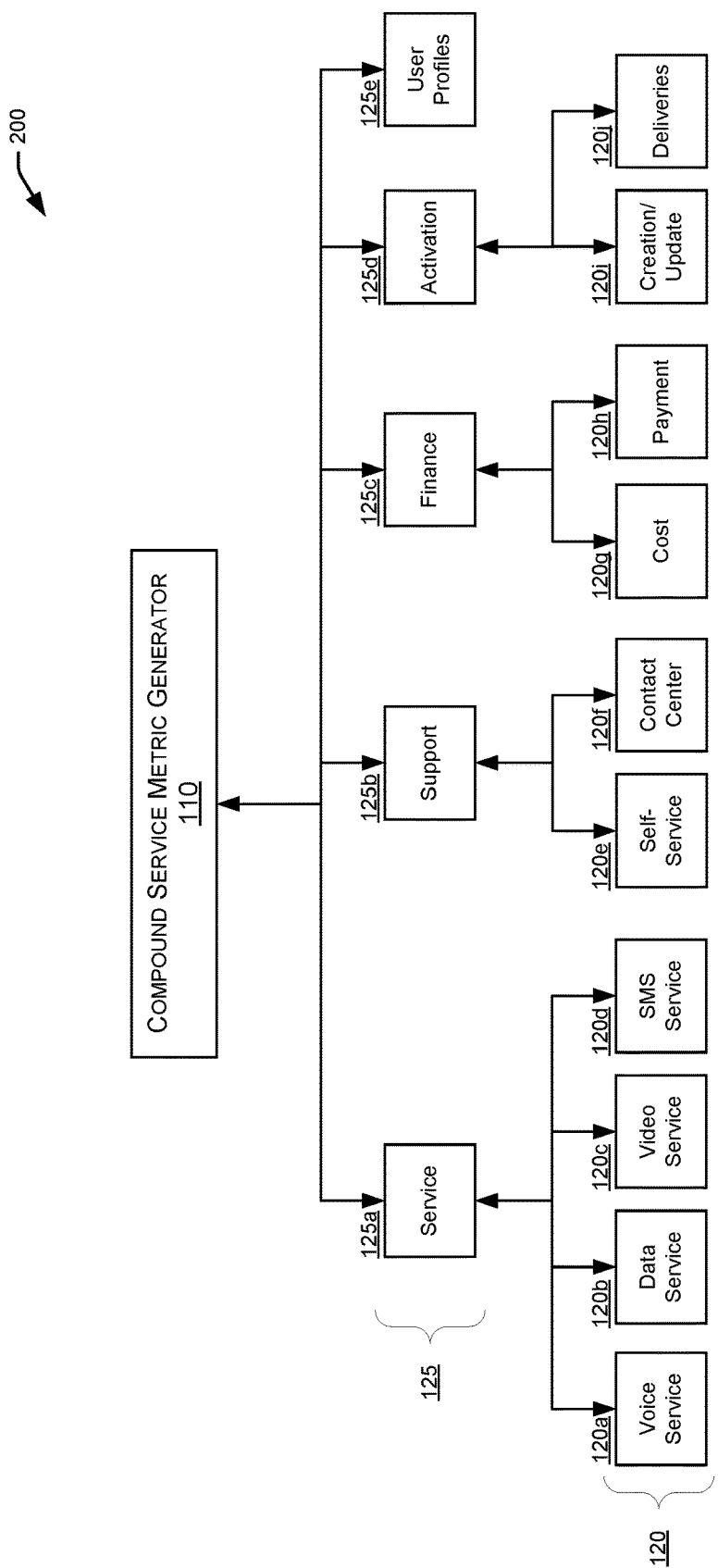
FIG. 2 shows an example compound service metric hierarchy, in accordance with one or more embodiments of the present invention.

Referring now to FIG. 2, an example diagram is shown illustrating a compound service metric hierarchy in accordance with certain embodiments of the present invention. In the example hierarchy diagram 200, a number of different services 120 are configured to collect and transmit service-specific data metrics, through one or more intermediate layers 125, to a compound service metric generator 110. As discussed above in FIG. 1, services 120 may correspond to the various servers/systems/applications operated by a communication services provider. For examples, as shown in hierarchy 200, certain services 120 may correspond to various communication services (e.g., voice service 120a, data service 120b, video service 120c, and SMS service 120d) as well as other communication services (not shown), such as gaming services, music/movie streaming services, home monitoring services, etc. Each communication service 120 may be implemented as one or more independently operated computer servers, systems, and/or source applications 121, which may be configured to monitor the operation of the service 120 and transmit data metrics to the compound service metric generator 110. Additional types of services 120 need not be associated with any specific communication service, but instead may correspond to the various servers, systems, and applications that are operated by the service provider and are not service-specific. As shown in this example, these additional services 120 may correspond to the different customer point-of-contact systems operated by the communication service provider, such as self-service 120e and contact center 120f support systems, cost 120g and payment 120h systems, activation creation/update 120i and delivery systems 120j, etc.

As shown in FIG. 2, the various services 120 may transmit their respective data metrics to a compound service metric generator via one or more intermediate layers 125. As discussed above in FIG. 1, the different services 120 may use various different combinations of communication networks, transmission protocols and techniques, and may (or may not) be configured to transmit service data metrics securely. In this example, services 120a-d may transmit their respective service-specific data metrics to intermediate service system 125, services 120e-f may transmit their respective service-specific data metrics to intermediate service system 125*b*, services 120*g-h* may transmit their respective service-specific data metrics to intermediate service system 125*c*, and services 120*i-j* may transmit their respective service-specific data metrics to intermediate service system 125*d*. It should be understood that the examples of services 120*a-j* and intermediate layers 125*a*-125*e* shown in hierarchy 200 are illustrative only, and that other types of services 120 and relationships between services and intermediate layers 125 may be used in other examples. For instance, the services 120 of a particular communication service provider may be designed and implemented such that each different communication service 120*a-d* has separate associated support services, payment services, and activation services, etc. Additionally, separate user profiles 125*e* may be maintained for customers of different communication services 120*a*-120*d* in some embodiments. As another example, a communication service provider may implement support services 120*e-f* and activation services 120*i-j* that transmit data metrics to the same intermediate layer 125, and so on. In these examples, along with many other possible implementations, the corresponding compound service metric hierarchy 200 may be based on the different services, and the relationships/dependencies between the underlying servers/systems/applications of those 112. Additionally, for embodiments in which other types of services 120 are implemented rather than communication services (e.g., cloud resource services 120, utilities services 120, computing infrastructure services 120, etc.), it should be understood that a different hierarchical structure 200 may be implemented based on the different services 120 and the relationships/dependencies between services 120.

In various embodiments, the intermediate layers 125 may be implemented as physical systems, or alternatively as virtual and/or conceptual hierarchical layers. For example, each intermediate layer 125 may correspond to physical computing system including a specialized set of hardware and/or software configured to receive, aggregate, and analyze the data metrics from its child/client services 120. In some cases, each intermediate layer 125 may include some or all of the same components as the compound service metric generator 110. For instance, certain hierarchies 200 may include hierarchical networks of parent-child compound service metric generators 110, each of which is configured to receive data metric from one or more child services 120 and/or child intermediate generators 125, and to define and execute compound service metrics based on its received data. In such cases, intermediate systems 125 (e.g., intermediate compound service metric generators 125) may be configured to maintain individual service data metrics and to calculate one or more service-agnostic compound metric values. The top-level compound service metric generator 110 may calculate compound service metrics based on multiple the service-agnostic compound metrics received from underlying intermediate generators 125. As noted above, the compound service metrics calculated by the intermediate generators 125 and/or top-level generator 110 may include, for example, compound customer sentiment metrics, compound customer value metrics, and/or compound customer resource usage metrics, etc.

As this example illustrates, implementations using a compound metric hierarchy 200 may be used to generator compound metrics for different points of contact (e.g., service 125*a*, support 125*b*, finance 125*c*, activation 125*d*, etc.), and may further separate those points of contact into different underlying services (or dimensions) 120. Such embodiments may allow service providers to generate, compare, and aggregate compound service metrics between different customers and/or groups of customers. For instance, a prepaid mobile phone customer of a service provider might only use voice services 120*a*, and may never may contact with the device delivery service 120*j*, because of a bring your own device (BYOD) policy associated with the customer's account. In contrast, a different customer with a postpaid premium account may use the data service 120*b* and also may have received and activated a device via the delivery and activation services 120*i-j*. In this example, although the different customers have used different services (or dimensions) 120 via different points of contact 125, the compound metric hierarchy 200 and techniques for generating compound service data metrics discussed herein may allow for the same compound service metrics to be generated and compared/aggregated for these customers. Using similar techniques, identical sets of compound service metrics may now be generated for and analyzed/compared among different customers or groups of customers, regardless of the different services 120, points of contact 125, service bundles/packages, and usage patterns or behaviors of the different customers.

As discussed in the above examples, intermediate layers 125 may be implemented as separate physical systems (e.g., intermediate compound metric generators 125) within the communication networks and computing infrastructures of a communication services provider. However, in other examples, intermediate layers 125 need not be implemented as separate physical systems, but instead may correspond to separate software/data sub-systems operating within the compound service metric generator 110. In such cases, each service 120 may transmit its respective data metrics to directly the generator 110 and not to any separate intermediate system 125. Once the data metrics are received by the generator 110, the generator 110 may route the data to the appropriate intermediate compound metric services 125 and/or data stores, and these intermediate services 125 operating within the generator 110 may be configured to define and calculate different sets of intermediate compound service metrics. In such cases, a top-level instance of a compound service metric generator 110 may receive data metrics from the intermediate services 125 operating within the same physical system/data center/etc. In such embodiments, the intermediate services 125 operating within the generator 110 may be configured to define and calculate different compound metrics corresponding to different points of contact (e.g., service 125*a*, support 125*b*, finance 125*c*, activation 125*d*, etc.), and also may use different secure communication techniques, data storage techniques, and may be configured for different access permissions by different users/roles.

Figure 3:
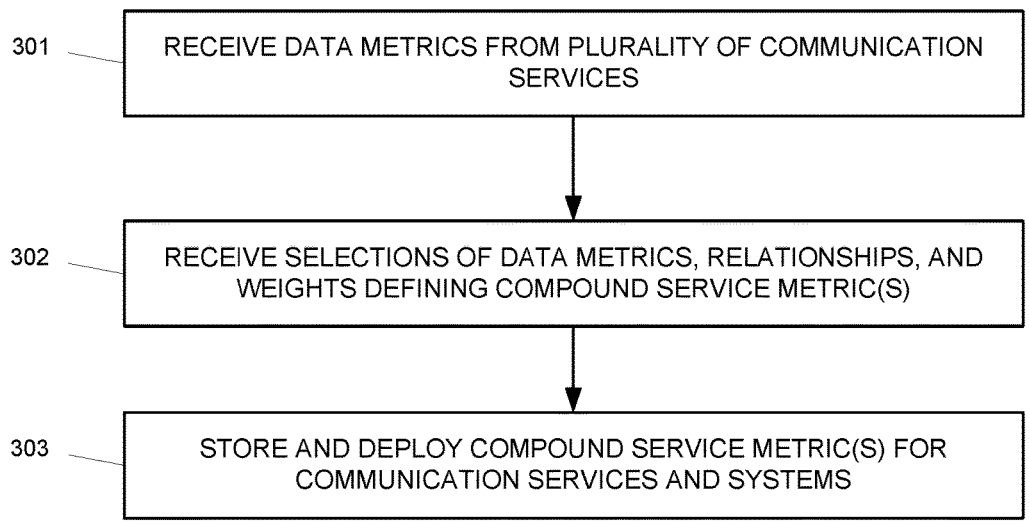
FIG. 3 is a flow diagram illustrating an example process of defining compound service metrics, in accordance with one or more embodiments of the present invention.

Referring now to FIG. 3, a flow diagram is shown illustrating an example process of defining compound service metrics. As described below, the steps in this process may be performed by one or more components in the system 100, and other related systems and components described above. For example, steps 301-303 may be performed by a compound service metric generator 110 in some embodiments. In other cases, different combinations of one or more compound service metric generators 110, associated data stores 115, services 120, and client devices 130 may be used to perform the steps described below. Additionally, it should be understood that the techniques described herein for defining, storing, and deploying compound service metrics need not be limited to the specific systems and hardware implementations described above in FIGS. 1-2, but may be performed within other computing environments comprising other combinations of hardware and software components.

In step 301, a compound service metric generator 110 associated with a service provider may receive various service-specific data metrics from each of the different services 120. In the cases of a compound service metric generator 110 associated with a communication services provider, the services 120 transmitting the data metrics may include any or all of the services 120 discussed above in FIGS. 1-2. For example, computer servers, systems, and/or source applications 121 associated with voice, data, video, and SMS services 120 may be transmitted using the various communication techniques described above. Additionally, the generator 110 may receive data metrics from various customer point-of-contact systems 120, such as support services, activation services, finance services, etc. Additional data metrics related to communication services may be received in step 301 from network monitoring services 120 and/or other third-party services, which may be capable of detecting network quality, status, and performance data, as well as network events that cannot be detected by the higher-level communication services 120a-120d. For embodiments in which service providers implement and support other types of services 120, rather than communication services, such as cloud resource services 120, utilities services 120, computing infrastructure services 120, etc., it should be understood that the generator 110 may receive different types of data metrics from different services 120. In any of these embodiments, the data metrics received from different services 120 may be transmitted over a variety of different communication networks, directly or indirectly via intermediate systems 125, and may use different data transmission techniques, protocols, security, etc. Additionally, in some implementations, step 301 may include data transformation and/or the use of aggregation algorithms to correlate data from different data sources.

In some examples, the data metrics received from a voice service 120a may include a number of different signaling metrics, such as call completion rate, service availability, and a number (or percentage) of short calls having a call duration under a specific threshold. Additional data metrics received from a voice service 120a may include a number of different media quality metrics, such as number (or percentage) of calls having a bad average voice quality below a certain voice quality threshold, and a number (or percentage) of calls having a bad voice quality below a certain voice quality threshold at/near the end of the call (e.g., within the last 30 seconds of the call). The data metrics received from a data service 120b may include, for example, a number (or percentage) of short data sessions (e.g., data sessions have a short packet data protocol (PDP) context, based on a threshold). The data metrics received from a video service 120c may include, for example, the number (or percentage) of videos that were watched until the end of the video (e.g., where the viewing percentage exceeds a 95% threshold or other complete viewing threshold), the number (or percentage) of shorted/aborted videos in which the user did not complete the viewing of the video, the average video duration, and an average (or total) number of video retrieval/playback stalls during video viewing. The data metrics received from a short message service (SMS) service 120d may include, for example, the number (or percentage) of SMS messages delivered and not delivered, as well as the message sizes, delivery network(s) used, network conditions, and geographic locations associated with the sending and receiving the delivered and undelivered messages. It should be understood that these example data metrics are illustrative only and non-limiting, and that any other types of voice session metrics, data session metrics, video session metrics, SMS data metrics, gaming service metrics, music/movie streaming service metrics, home monitoring service metrics, etc. may be received from communication services 120 in step 301. Each of the data metrics transmitted by various communication services 120a-d may be associated with a specific customer or group of customers, or may be customer-agnostic and may apply to all users of the service 120.

Additionally, as noted above services 120d-j, corresponding to the servers, systems, and/or source applications 121 of a customer point-of-contact for a service provider, may transmit additional data metrics to the compound service metric generator 110. For example, data metrics received from the support point of contact system(s) 125b may include various metrics from the contact center service (or dimension) 120f, such as a first call resolution (FRC) metric, a number (or percentage) of open support tickets, a number of contacts with the contact center through different channels, an average support ticket duration time, and an average wait time before a customer speaks to an agent. Additional data metrics received from the support point of contact system(s) 125b may include various metrics from the self-service service (or dimension) 120e, such as the numbers (or percentages) of self-service processes that did/did not escalate to customer support (e.g., WEBRTC calls with context). Additional data metrics may be received via financial point of contact system(s) 125c, including various resource usage/cost data metrics from cost service 120g and various payment metrics from payment service 120h, as well as from activate point of contact system(s) 125d, including various account/service activation and update data from service 120i, and equipment delivery metrics from service 120j. User profile data metrics also may be received from various servers, systems, applications of a user profile system 125e, including customer demographic data (e.g., customer age, geographic location, etc.) number of customer contracts, customer loyalty metrics, and customer usage metrics relating to the customer's usage of the various services 120a-j.

Further examples of additional data metrics that may be received in step 301, from services 120a-120j and/or other data sources may include, for example, social networking data associated with customers and/or groups of customers, data regarding offer uptake rates and marketing effectiveness, customer activity data (e.g., customer purchases), return-on-investment data for customers and/or groups of customers, cost of retention data for customers and/or groups of customers (e.g., based on customers support costs, credits or refunds issues, cashback offers, etc.), customer loyalty and/or advocacy metrics, average order value (AOV) data, and customer shopping cart abandonment metrics. As noted above, these additional data metrics and others relating to the various services 120 and points of contact supported by a communications service provider, may be received from other data sources such as the servers/systems/applications of social networking services, educational services, public-sector services, etc.

In step 302, the compound service metric generator 110 may receive selections of data metrics, relationships between data metrics, and/or weight values that may define one or more compound service metrics. In some embodiments, the selections of data metrics, relationships, and/or weight values may be received from authorized users via client devices 130. For example, the compound service metric generator 110 may provide one or more graphical and/or programmatic interfaces that allow users to define compound service metrics based on the various different types of data metrics received in step 301. Using the various interfaces provided by the generator 110, a user may view and select a plurality of different data metrics received from different services 120, may optionally define relationships (e.g., grouping, parent-child, etc.) between the selected data metrics, and also may optionally assign weight values to the selected data metrics and/or groupings of data metrics. As discussed below in more detail, the selected set of data metrics, relationships, and/or weight values may define a compound service metric that may be used to calculate and analyze various service-agnostic data, such as service-agnostic customer sentiment, service-agnostic customer value, and service-agnostic customer resource usage metrics. Specifically, these compound service metrics may provide service-agnostic data metrics to allow service providers to analyze and compare various customer metrics (e.g., customer sentiment, customer value, customer resource usage, etc.) and combinations of such metrics between different customers and/or groups of customers having different service bundles/packages/subscriptions, different points of contact, different usage behaviors or patterns, etc.

In some embodiments, selections of data metrics from different services 120, relationships between data metrics, and metric weighting values may be received from a single domain expert or a combination of different domain experts from different business units and/or associated with different services 120. For example, in the generation of a compound (or service-agnostic) customer sentiment metric, one or more domain experts associated with the various services 120 may login to the generator 110, and access a user interface (or invoke or a programmatic interface) to select one or more service-specific data metrics relevant to service-specific customer sentiment. The same interfaces may be used to allow the domain experts to define an initial set of relationships between different service-specific metrics, as well as assign weights to the different selected metrics. Similarly, when generating a compound customer value metric, one or more domain experts may select various service-specific data metrics from services 120 which are relevant to customer value. As another example, when generating a compound customer resource usage metric, one or more domain experts may select various service-specific data metrics from services 120 which are relevant to customer resource usage amounts/costs. In some cases, the generator 110 may control the data access and collaboration between domain experts when defining compound service metrics. For instance, a specific domain expert might only be given access to view and select data metrics from a subset of the services 120, while other domain experts may be assigned to select data metrics, define relationships, and assign weights from different services 120.

Figure 4:
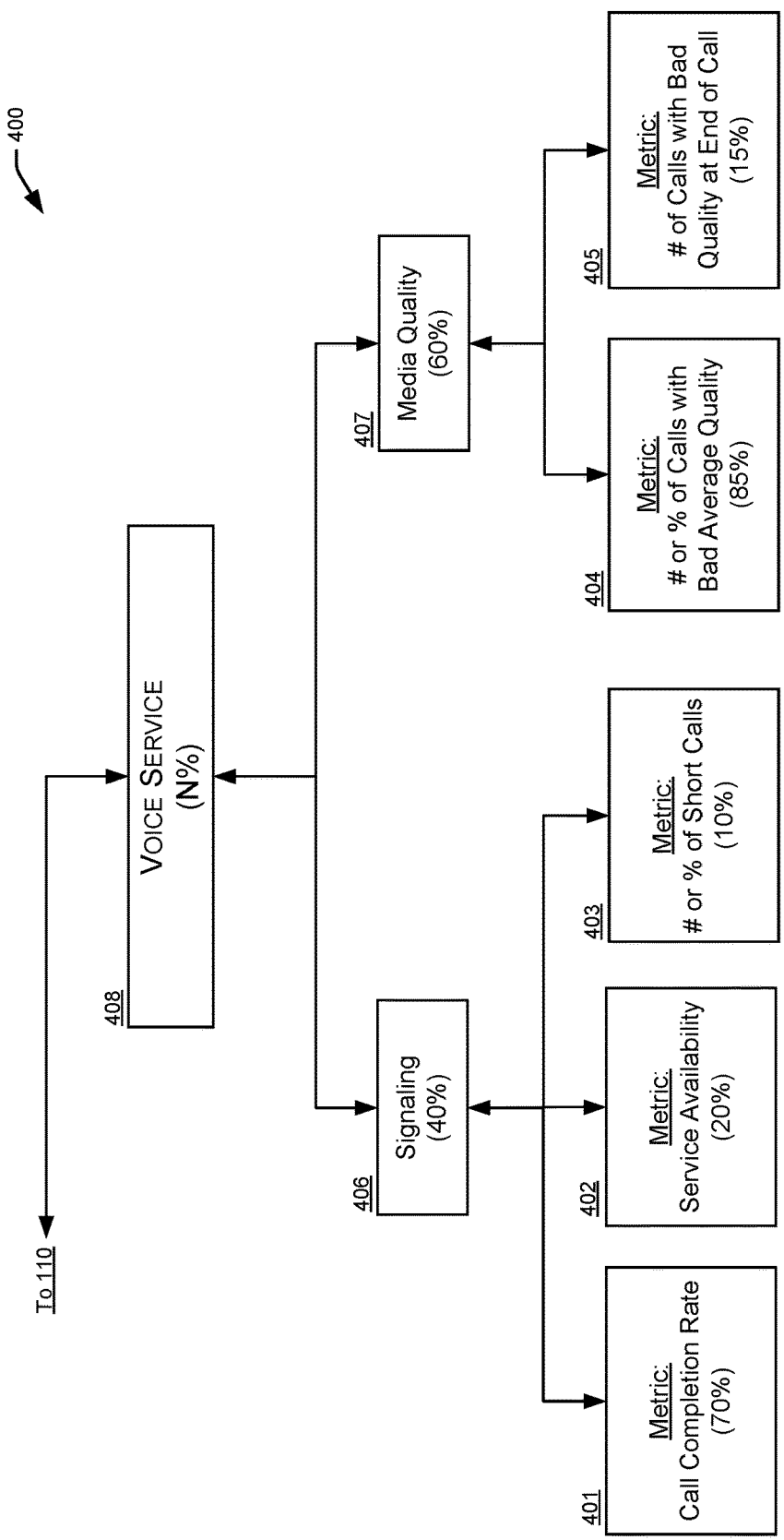
FIG. 4 shows a diagram illustrating a number of data metrics, relationships, and weight factors corresponding to a portion of a compound service metric definition, in accordance with one or more embodiments of the present invention.

Referring briefly to FIG. 4, an example diagram is shown which graphically represents a portion of a compound service customer sentiment data metric. In this example, a hierarchical diagram 400 shows five different data metrics 401-405 associated with a voice service 120a. The data metrics 401-405 in this example have been grouped into two separate categories: signaling metrics and media quality metrics. This example also shows a weighting factor, expressed as a percentage (0%-100%) for each of the data metrics 401-405, and for each of the categories. Compound service metrics definitions may be presented graphically, as in this example, via a user interface by the generator 100, in order to allow users to easily view, understand, and edit the definitions. However, it should be understood that compound service metric definitions need not be rendered or stored graphically, but can be stored and edited as mathematical equations in other examples.

The process for calculating compound metric values for individual customers (or groups of customers) may be illustrated briefly using the example compound service metric definition shown in FIG. 4. In this example, after receiving data for each of the data metrics 401-405, these data metrics may be weighted and combined as indicated in the hierarchy 400. For example, data metric 401 may be multiplied by a weighting factor of 70%, data metric 402 may be multiplied by a weighting factor of 20%, and data metric 403 may be multiplied by a weighting factor of 10%. Weighted data metrics 401-403 may be added together to determine a customer sentiment signaling data metric 406 for the voice service 120a. Using similar processes, data metric 404 may be multiplied by a weighting factor of 85%, and data metric 405 may be multiplied by a weighting factor of 15%, after which data metrics 404 and 405 may be added together to determine a customer sentiment media quality data metric 407 for the voice service 120a. The customer sentiment signaling data metric 406 then may be multiplied by a weighting factor of 40%, and the customer sentiment media quality data metric 407 may be multiplied by a weighting factor of 60%, and these category data metrics 406 and 407 may be added together to determine an overall customer sentiment data metric 408 with respect to the voice service 120a. As shown in this example, the overall customer sentiment data metric 408 for the voice service 120a may be further weighted by N % and then combined with other customer sentiment data metrics from one or more other services (e.g., 120b-120j), and so on. Further examples of the different processes and embodiments relating to calculating compound metric values are described in more detail below in reference to FIG. 6. Additionally, each of the data metrics 401-408 shown in this example may be used multiple times to create different compound metrics. For example, the compound voice signaling metric 406 may be used as shown in FIG. 4, but also may be used in a separate service-agnostic 'signaling quality' metric that bundles all signaling metrics from voice, video, SMS, and/or other services.

Returning now to FIG. 3, in step 303 the compound service metric generator 110 may store and deploy the compound service data metric(s) defined in step 302. In some embodiments, the data defining the compound service data metrics (e.g., the selected services 120, source applications 121 and individual data metrics, as well as the data metric relationships, assigned weights, etc.) may be stored as mathematical equations and/or data structures on the generator 110 and/or within the data store 115. The compound service data metric definitions may then be deployed, that is, used by one or more executing processes/applications to calculate compound service metric values for customers associated with the service provider.

In some embodiments, one or more customer report generation processes may execute on the generator 110, or on other servers/devices in the system 100, and may use compound metrics defined in step 302 to calculate values for individual customers and/or groups of customers. In certain cases, the generator 110 may support an ad hoc report generation tool that allows authorized operators at client devices 130 to calculate compound service metrics for an identified set of customers. For instance, an operator interacting with a user interface provided by the generator 110 may select a particular compound service metric to be calculated (e.g., a compound customer sentiment, a compound customer value metric, a compound customer resource usage metric, etc.), and also may select one or more customers for which the compound metric is to be calculated. In response, the generator 110 may retrieve the compound service metric definition, retrieve the component service-specific data metrics, and then calculate customer values for the compound service metric.

Scheduled and/or automated processes also may be executed at the compound service metric generator 110 (and/or other components in system 100). For example, service-specific and/or service-agnostic automated processes may be used to calculate customer sentiment, customer value, customer resource usage, etc., on a periodic basis. Such automated processes may be used to predict customer churn, financial performance, resource needs, and the like, for one or more services 120. Additionally, such automated processes may be used to identify customers for proactive customer support interventions, special incentives or discounts, targeted offers, or for routing/handling of customer service tickets. For instance, an automated process to measure service-agnostic customer sentiment may be periodically executed by the generator 110, using a compound service metric for customer sentiment to calculate updated customer sentiment values. Similar processes may be used to perform measurements of service-agnostic customer value, service-agnostic customer resource usage, etc. When calculating compound service metric values for an individual user or customer, only the data metrics received in step 301 that relate to that individual user or customer may be used in the calculations. Similarly, for calculating compound service metric values for different groups of customers, the data metrics received in step 301 relating to one or more members of the group may be used in the calculations. For example, service-agnostic customer sentiment metrics, customer value metrics, and customer resource usage metrics may be calculated for groups of customers within the same geographic region, groups of customers subscribing to the same service bundles/packages, groups of customers operating the same user equipment, and/or groups of customers having common demographic traits, and so on.

Figure 5:
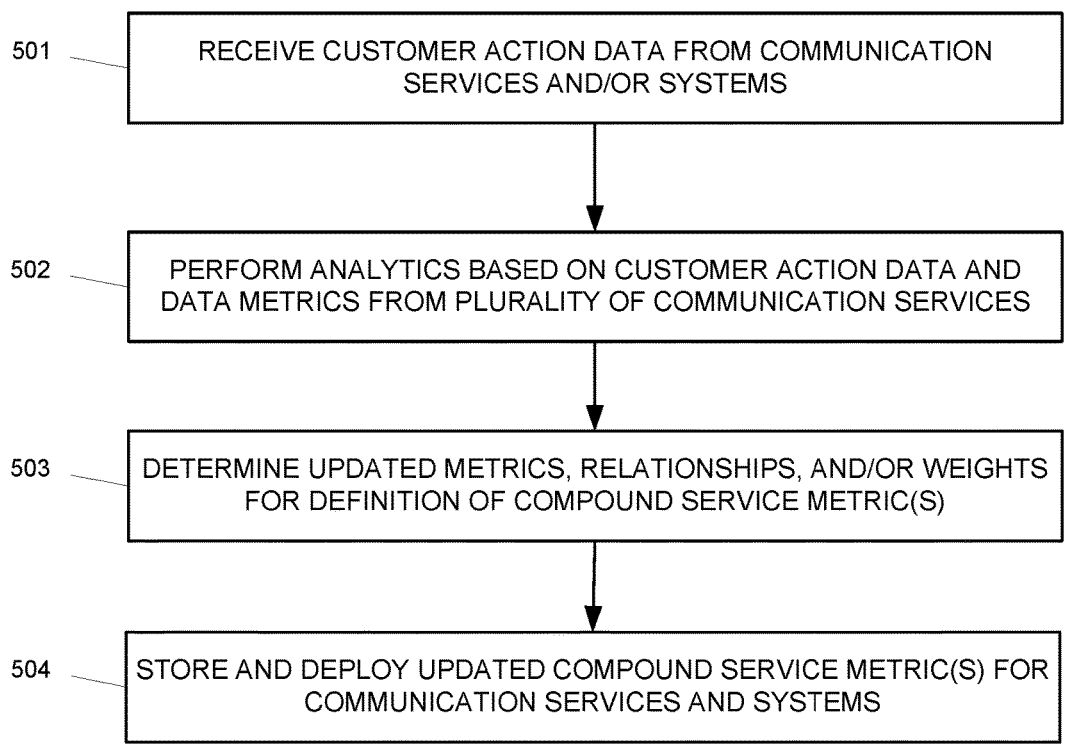
FIG. 5 is a flow diagram illustrating an example process of updating compound service metrics based on customer action data, in accordance with one or more embodiments of the present invention.

Referring now to FIG. 5, another flow diagram is shown illustrating an example process of updating compound service metrics based on customer action data. As discussed below, this example process relates to analyzing customer actions in conjunction with data metrics, in order to determine compound service metric definitions. In some cases, the steps in this process may be performed following steps 301-303, in order to update a previously determined compound service metric definition. In other cases, the steps in this process may be used to initially determine and create compound service metric definitions, and thus may be performed instead of steps 301-303 in some examples. Like steps 301-303, the steps in this process may be performed by one or more components in the system 100, and other related systems and components described above. For example, steps 501-504 may be performed by a compound service metric generator 110, associated data stores 115, services 120, and/or client devices 130. Additionally, it should be understood that the techniques described herein for determining and updating compound service metric definitions need not be limited to the specific systems and hardware implementations described above in FIGS. 1-2, but may be performed within other computing environments comprising other combinations of hardware and software components.

In step 501, a compound service metric generator 110 may receive customer action data from various services 120a-d, point of contact systems 120e-j, and/or other systems associated with a service provider. The customer action data may include any user-initiated actions relating to the service provider. In some cases, the customer action data may be received from the same servers, systems, and/or source applications 121 of the various services 120, using the same communication channels and techniques. In other cases, the customer action data may be received from other systems separate from the services 120, such as the internal systems of the service provider and/or third-party systems.

As noted above, the customer action data may be analyzed and used to determine or update compound service metric definitions. Accordingly, the specific types of customer action data received in step 501 may include the customer action data that is relevant to the particular compound service metric definitions to be determined/updated. For example, to determine/update a customer sentiment compound service metric, the customer action data may include data regarding customer complaints, data regarding customer submissions of service tickets, completed customer feedback surveys, and/or changes in the customer's subscriptions or purchases from the service provider (e.g., changing bundles/packages, adding or canceling services, etc.). As another example, when determining or updating a customer value compound service metric, the customer action data may include data regarding the customer's subscriptions or purchases from the service provider, the customer's orders of video content (e.g., video-on-demand (VOD) or pay-per-view (PPV) programs), the customer's orders/purchases of additional user equipment (e.g., mobile phones, television receiver set-top boxes, network appliances, etc.), and/or the customer's billing/payment history (e.g., customer bill payments, failures to make bill payments, previous refunds or credits offered to the customer, etc.). As yet another example, when determining or updating a customer resource usage compound service metric, the customer action data may include data regarding the customer's usage of various communication networks (e.g., voice network usage including the number, length, and time of outgoing/incoming voice calls, data network usage including the amounts of upstream and downstream transmissions, video network usage including satellite and cable network transmissions/receptions, etc.) customer-initiated service calls and other interactions with customer service personnel, etc.

In step 502, the compound service metric generator 110 may use analytics processes to identify correlations between the customer action data received in step 501, and one or more corresponding data metrics. For example, the generator 110 may perform various computational analyses on the service-specific data metrics received from various services 120 in step 301, and the subsequent customer action data received in step 501, in order to identify particular data metrics that are positively or negatively correlated with particular customer actions. As discussed above in step 501, customer actions may include user-initiated actions by a customer relating to the service provider, such as bundle/subscription changes, purchases, account modifications, complaints or positive feedback, etc. In step 502, analytics may be performed on the data in the compound service metric data store 115, in order to determine correlations between various data metrics and any customer action or combination of customer actions.

For instance, data metrics such as a low call completion percentage, low voice service availability, and low call quality each may correlate, to a greater or lesser degree, with customer cancelations of the voice service 120a. Additional data metrics such as a high customer service ticket response time, slow equipment delivery times, and failure to offer refunds/credits for customer complaints also may correlate, to a greater or lesser degree, with customer cancelations of the voice service 120*a*. In contrast, data metrics such as a high call completion percentage, service availability, and call quality, as well as a high level of responsiveness to customer complaints, fast equipment delivery times, etc., each may correlate, to a greater or lesser degree, with customer renewals and/or new customer accounts for the voice service 120*a*. It should be understood that these examples are illustrative and non-limiting only, and that the analytics processes in step 502 may determine correlations between any values or ranges of individual data metrics and/or combinations of data metrics, and the subsequent user-initiated actions of customers. Sets of correlating data metrics, and the strength/degree of the correlations, may be determined for customer actions such as enrollment, cancelation, or renewal of customers into each of the different communication services 120*a-d*, and/or other types of services that may be used in other embodiments (e.g., cloud services, computing infrastructure services, etc.). The analytics performed in step 502 also may correlate data metrics relating to various point-of-contact systems 120*e-j* with different customer actions such as purchases, subscriptions changes, service usage patterns, etc., that may affect individual communication services 120*a-d* (e.g., lower/higher service usage, lower/higher customer churn for a service 120), or may affect all services offered by the service provider (e.g., new service provider accounts or account cancelations, etc.).

In addition to determining correlations between service-specific data metrics and customer actions, the analytics processes in step 502 may determine the directions and magnitudes of such correlations. For instance, given a first data set from a first system 100, the compound service metric generator 110 and/or data store 115 may perform analytics to determine that a high positive correlation exists between a first data metric (e.g., low call quality) and a customer action (e.g., voice service cancelation), and that a much lower positive correlation exists between a second data metric (e.g., failure to respond promptly to customer support tickets) and the same customer action (e.g., voice service cancelation). However, in a second data set from a second system 100, the analytics performed by the generator 110 and/or data store 115 may determine the opposite magnitudes of the same correlations (and/or may determine different correlation directions, or entirely different correlations). Additionally, the analytics processes in step 502 may include determining correlative relationships between groups of multiple data metrics and subsequent customer actions.

The data analytics processes performed in step 502 may include, in various embodiments, machine learning activities, classification activities using large volumes of raw data, a Bayesian Belief Network (BBN) engine, non-linear regression processes, and the like. In some cases a neural network may be generated and trained, using input data (e.g., service-specific data metrics) and output data (e.g., customer-initiated actions) during the training process. Such processes may involve pattern recognition and adaptive machine learning, to form correlations between the various inputs and outputs in order to train the neural network to predict customer actions and/or to perform other predictive analyses based on future data metrics. In some embodiments, the analytics processes in step 502 may be performed continuously as new data metrics are received from services 120 and as new customer action data is received in step 501. In some cases, the generator 110 and/or data 115 performing the analytics may establish a schedule to execute the data analytics process and update the determine correlations.

In step 503, the compound service metric generator 110 may determine updated definitions of compound service metrics based on the analytics processes performed in step 502. As discussed above in step 302, compound service data metric may be defined using a set of service-specific data metrics received from services 120, along with assigned weights for the data metrics and/or relationships between the data metrics. As discussed above, FIG. 4 graphically represents a portion of an example compound service metric definition relating to customer sentiment. Updating compound service metric definitions in step 503 may include, for example, adding or removing service-specific data metrics (e.g., 401-405), updating the groupings between data metrics, updating the hierarchical relationships (e.g., adding or removing new intermediate layers, assigning different data metrics to different intermediate layers, etc.), and/or updated the assigned weights for data metrics and for different groupings/intermediate layers of data metrics.

As discussed above, certain compound service metrics may be difficult or even impossible to classify precisely, for example, customer sentiment. In such cases, the service provider may the compound service metric in terms of certain customer action data. For example, a service provider administrator may establish a proxy for measuring customer sentiment based on a combination of customer-initiated actions (e.g., customer satisfaction survey results, customer purchases, customer complaints, additions or removals of services from customer bundles/subscriptions, etc.). Other types of compound service metrics may be measured unambiguously based on data available to the service provider, such as the value or profitability of a particular customer to the service provider, the amount of physical/network resources of the service provider used a particular customer, etc. Regardless of whether a compound service metric may be measure precisely (e.g., based on financial data, resource usage, etc.) or whether a proxy measurement is defined (e.g., customer sentiment), the compound service metric definitions and the techniques for defining and updating the compound service metrics may be the same. For instance, in each of these examples of compound service metrics, a set of service-specific data metrics may be identified, combined/grouped and/or weighted to serve as the compound service metric definition from which values may be calculated for individual customers or groups of customers.

As shown in this example, FIG. 5 may be used to update a previously defined compound service metric. For example, steps 501-504 may be performed following the initial definition of a compound service metric in step 301-303. In such embodiments, as discussed above in step 302, an operator may manually select a set of service-specific data metrics, and may assign groupings, hierarchical relationships, and weighting factors to define a particular compound service metric. In such cases, the analytics performed in step 502 and the updated data metrics, relationships, weights, etc., determined in step 503 may be used to tune and/or optimize the previously defined compound service metrics. However, in other embodiments, the techniques described in steps 501-504 may be used to initially determine definitions of compound service metrics, rather than updating previously determined definitions.

In step 504, the compound service metric generator 110 may store and deploy the updated compound service data metric(s) defined in step 503. In some embodiments, step 504 may be similar or identical to step 303, discussed above.

For example, the generator 110 and/or data store 115 may store the data defining the compound service data metrics as mathematical equations and/or data structures on the generator 110 and/or within the data store 115. The compound service data metric definitions may then be deployed for use by one or more executing processes/applications to calculate compound service metric values for customers associated with the service provider. Specifically, one or more customer report generation processes may be configured to use the updated definitions of the compound service metrics when performing calculations of compound service metric values for individual customers and/or groups of customers of the service provider. As discussed above, such report generation processes may include ad hoc report generation tools or scheduled/automated processes used to perform service-agnostic customer data calculations, such as service-agnostic customer sentiment, service-agnostic customer resource usage, service-agnostic customer value/profitability data for the service provider, and the like, for individual customers and/or groups of customers.

Figure 6:
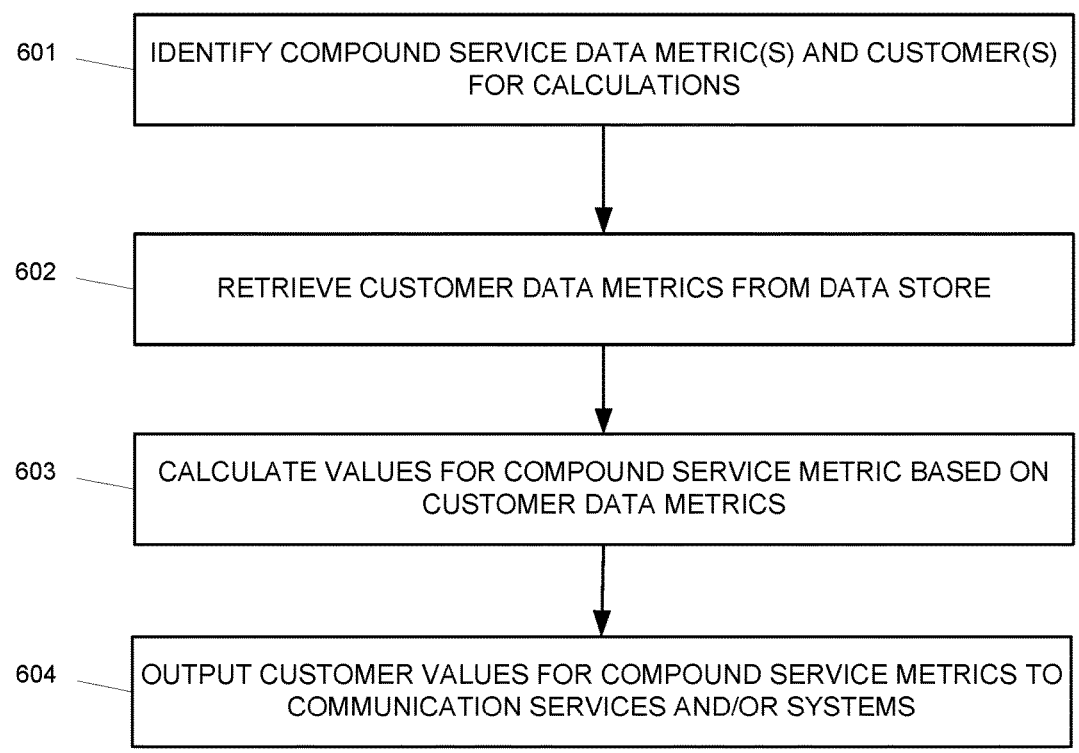
FIG. 6 is a flow diagram illustrating an example process of calculating compound service metric values based on customer data metrics, in accordance with one or more embodiments of the present invention.

Referring now to FIG. 6, a flow diagram is shown illustrating an example process of calculating compound service metric values based on customer data metrics. As discussed below, this example process relates to using compound service metric definitions to calculate service-agnostic data values for individual customers and/or groups of associated customers of the service provider. In some cases, the steps in this process may be performed the compound service metric generator 110 and/or other components in the system 100. However, it should be understood that the techniques described herein for calculating service-agnostic customer data metric values need not be limited to the specific systems and hardware implementations described above in FIGS. 1-2, but may be performed within other computing environments comprising other combinations of hardware and software components.

In step 601, the compound service metric generator 110 may identify one or more compound data service metrics to be calculated, along with one or more customers on which to perform the service-agnostic customer data metric calculations. As discussed above, in some embodiments the generator 110 may support one or more service-agnostic customer data metrics tools, including ad hoc user interface tools and/or automated and scheduled report generation tools. In step 601, the compound data service metrics to be calculated, and customers for which the service-agnostic data metrics should be calculated, may be identified/received via such tools. For instance, an administrator or other operator of the service provider may select one or more customers and one or more compound service metrics during a report generation process. In other examples, automated service-agnostic data metric processes may be preconfigured with the customer(s) and the compound service metric(s) for which the service-agnostic customer data values may be calculated. After receiving data identifying the service-agnostic data metric(s) to be executed, the generator 110 may retrieve the corresponding compound service metrics from the memory of the generator 110 and/or data store 115.

As noted above, compound service metrics may be calculated for individual customers or for groups of associated customers of the service provider. For example, a report generation tool and/or automated process may receive an individual customer identifier in step 601, and may trigger the calculation of compound service data metrics for that individual customer. In other cases, report generation tools and/or automated processes may receive one or more customer criteria or characteristics, and may be configured to calculate compound service data metrics for all customers meeting the received criteria or characteristics. For instance, an operator or automated process may be configured to calculate average or aggregate compound service data metric values for a set of customers within the same geographic region, a set of customers subscribing to the same service bundle/package from the service provider, a set of customer operating the same user equipment, a set of customers having common demographic traits, and/or a set of customers having the same patterns and behaviors for usage of various services 120 (e.g., the same usage patterns for phone service, television service, Internet service, etc.), and so on.

In step 602, the compound service metric generator 110 may retrieve the definitions for the compound service data metric(s) received/identified in step 601, and may use the definitions to determine one or more service-specific data metrics identified within the compound service data metric definition. For example, in the example definition illustrated graphically in FIG. 4, the component service-specific data metrics correspond to metrics 401-405. After identifying the service-specific data metrics, the generator 110 may retrieve the service-specific data metrics associated with the customer(s) identified in step 601, from the compound service metric data store 115. In some cases, the service-specific data metrics retrieved in step 602 may relate to specific customers, such as the data records of the customers' accounts, customer purchase histories, support tickets initiated by the customer, customer surveys, and/or the bundles/packages of services being subscribed to by the customers. In other cases, certain service-specific data metrics may be associated with larger groups of customers, such as service accessibility and quality metrics that may apply to all customers accessing a service 120 via a particular communication network, using particular user equipment, and/or from a particular geographic region. In step 602, both customer-specific data metrics as well as associated data metrics that apply to larger groups of customers may be retrieved for the customers identified in step 601.

In step 603, the generator 110 may calculate the values for the compound service metrics (e.g., service-agnostic data metrics) for the customers or groups of customers identified in step 601, using the customer data retrieved in step 115. For examples, the partial example of a customer sentiment compound service metric for shown in FIG. 4 may be used to illustrate techniques for calculating compound service metric values individual customers or groups of customers. In this example, after the customer data for each of the data metrics 401-405 is retrieved in step 602, these data metrics may be weighted and combined as indicated in the hierarchy 400. For example, the customer data for metric 401 may be multiplied by a weighting factor of 70%, the customer data for metric 402 may be multiplied by a weighting factor of 20%, and the customer data for metric 403 may be multiplied by a weighting factor of 10%. The generator 110 may sum the weighted data metrics 401-403 to calculate a customer sentiment signaling data metric 406 for the voice service 120a. Using similar processes, the customer data for metric 404 may be multiplied by a weighting factor of 85%, and the customer data for metric 405 may be multiplied by a weighting factor of 15%, after which the generator 110 may sum the weighted data metrics 404 and 405 to calculate a customer sentiment media quality data metric 407 for the voice service 120a. The generator 110 then may multiply the customer sentiment signaling data metric 406 by the weighting factor of 40%, and multiply the customer sentiment media quality data metric 407 by the weighting factor of 60%, and sum these category data metrics 406 and 407 together to calculate an overall sentiment data metric 408 for the customer(s) with respect to the voice service 120*a*. As shown in this example, the overall sentiment data metric 408 for the voice service 120*a* may be further weighted by N % and then combined with other customer sentiment data metrics from one or more other services (e.g., 120*b*-120*j*), and so on. Additionally, although this example relates to a particular compound service metric used to measure customer sentiment, similar techniques may be used to calculate any other compound service metrics, for example, a service-agnostic customer value metric, service-agnostic customer resource usage metric, etc.

In step 604, the generator 110 may output the customer compound service metric values calculated in step 603 to one or more client devices 130, services 120, and/or various other servers/applications within the system 100 or third-party systems. In some embodiments, the generator 110 may create reports and analyses including the customer compound service metric values (e.g., service-agnostic customer sentiment values, customer value/profitability values, customer resource usage values, etc.). Such reports and analyses may be transmitted back to the client devices 130 that initiated the report generation in step 601, and/or to various systems or applications of services 120. In some cases, the customer compound service metric values calculated in step 603 may be analyzed in step 604 and may trigger one or more automated processes by the generator 110 and/or services 120. For example, the customer values of the service-agnostic data metrics calculated in step 603 may be compared to one or more thresholds, and based on the results of the comparisons, the generator 110 may initiate various customized processes targeted to the customer(s). The customized processes that may be initiated in step 604 for particular customers, based on the service-agnostic data metrics for those customers, may include, for example, targeted product/service offers from the service provider or particular services 120, targeted incentives, refunds, or credits from the service provider and/or from particular services 120, suggestions of services or bundles/packages, etc.

Each of the methods described herein may be implemented by a computer system, such as computer system 110. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 7:
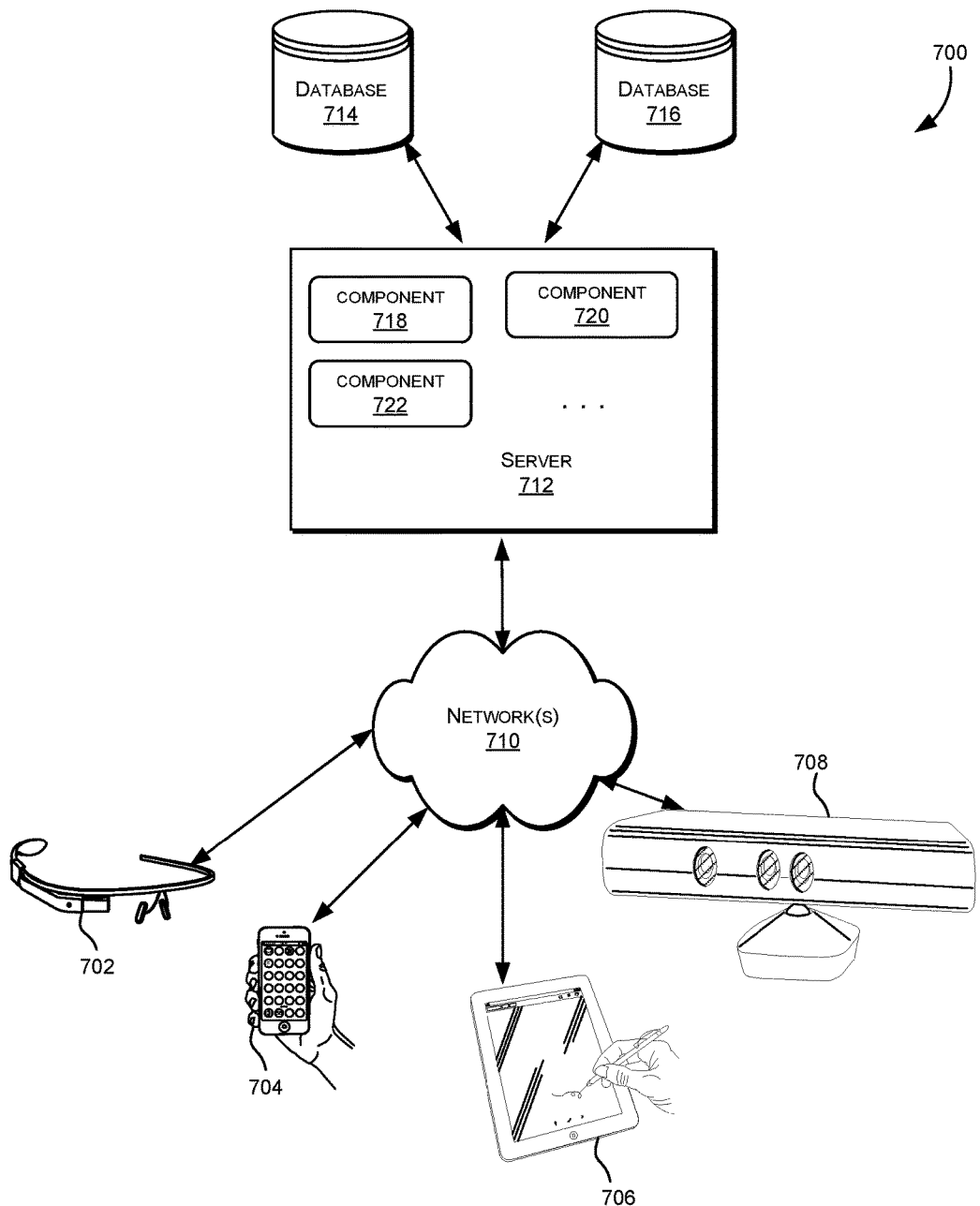
FIG. 7 depicts a simplified diagram of a distributed system for implementing an embodiment of the present invention.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms, Oracle Jet JavaScript technology, etc.), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transfer protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitor devices, network traffic management applications, etc.), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands, as well as big data (e.g., Hadoop) data structures, or a combination thereof.

Figure 8:
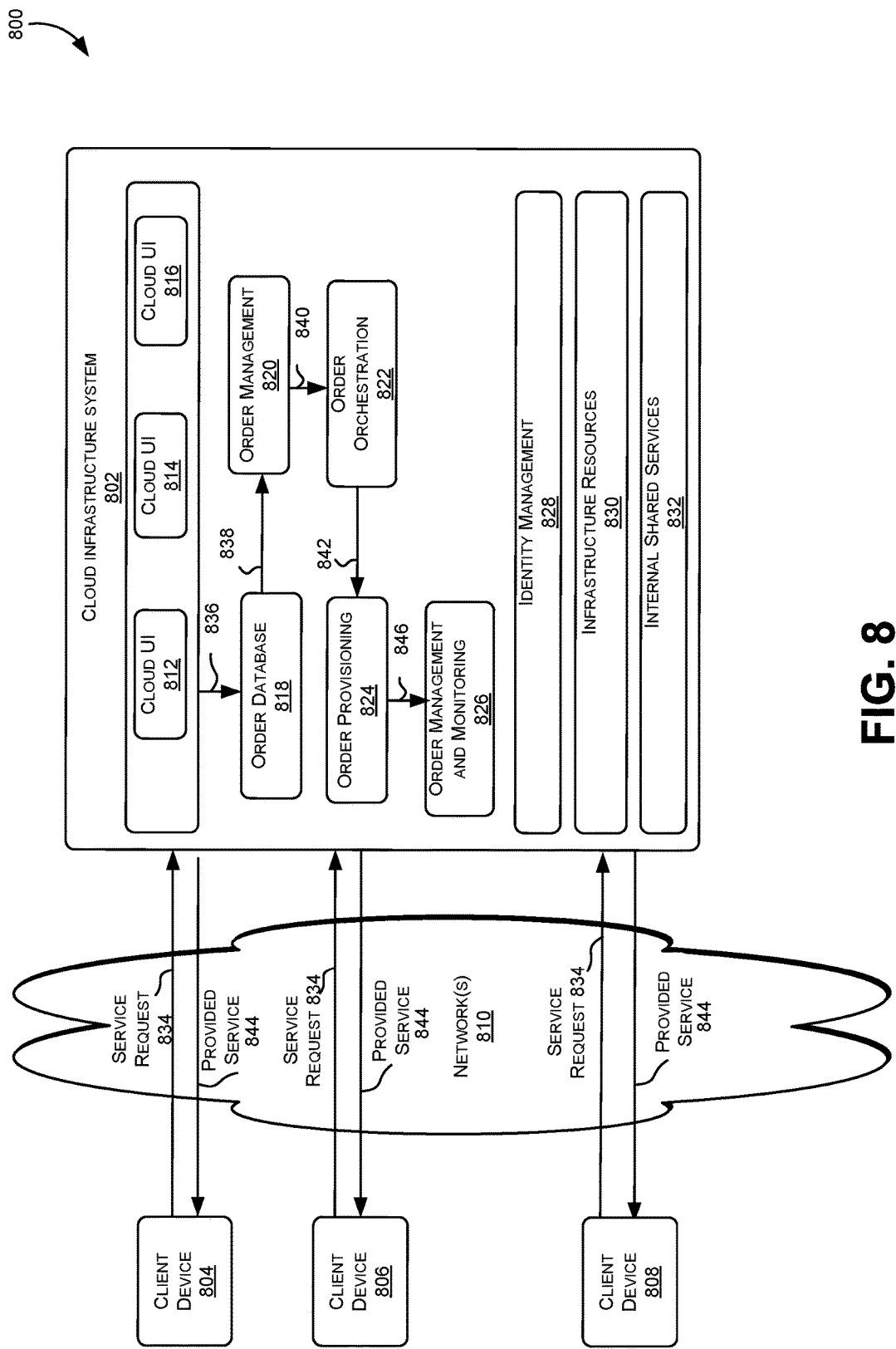
FIG. 8 is a simplified block diagram of one or more components of a system environment in which services may be offered as cloud services, in accordance with an embodiment of the present invention.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned or operated by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), Oracle Database as a Service (DBaaS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
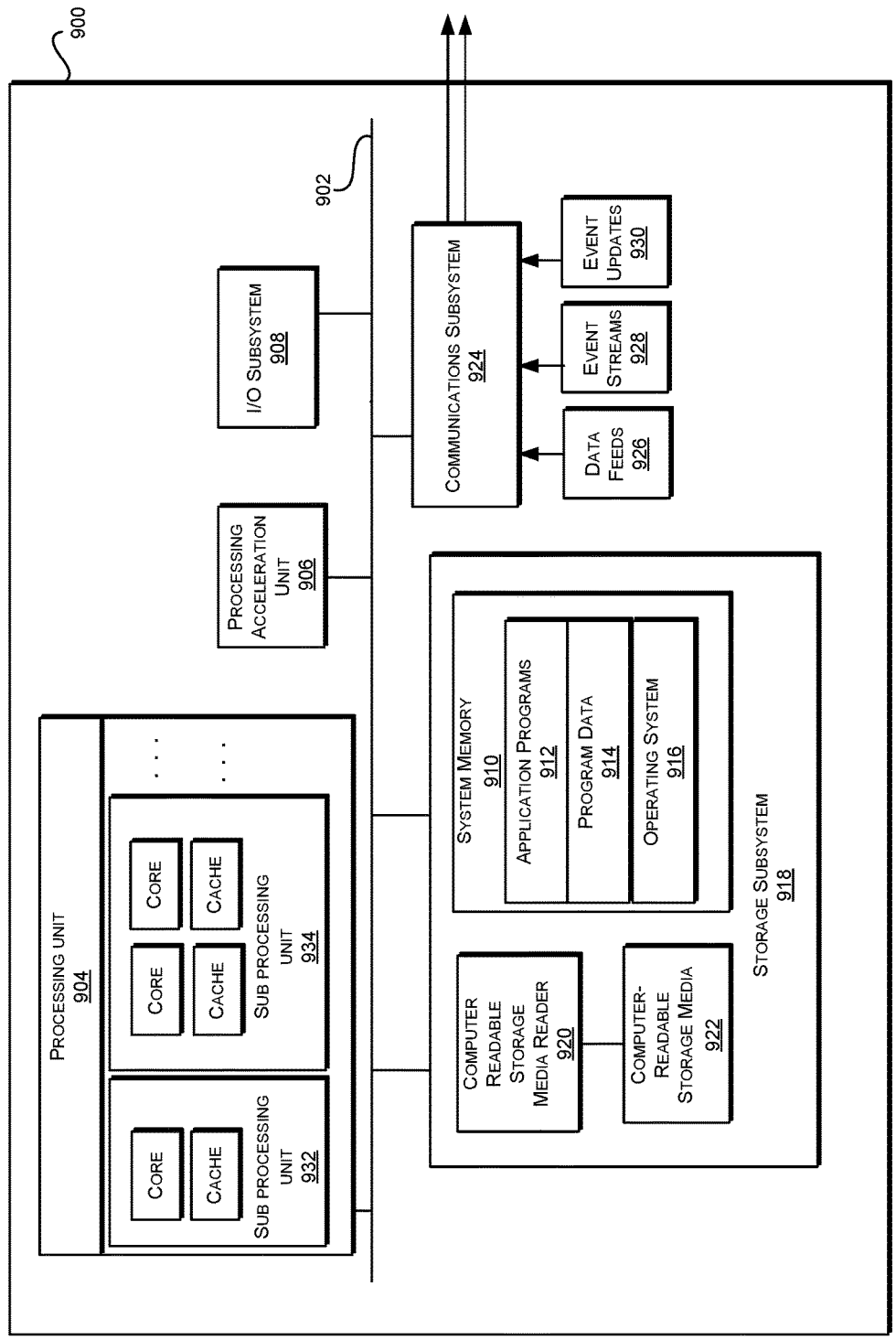
FIG. 9 illustrates an exemplary computer system that may be used to implement an embodiment of the present invention.

FIG. 9 illustrates an exemplary computer system 900, in which various embodiments of the present invention may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), Hadoop, etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring devices and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

What is claimed is:

1. A system comprising:
   one or more network interfaces configured to receive a data metrics from a plurality of communications service systems;
   a data store configured to store the data metrics received from the plurality of communications service systems;
   a processing unit comprising one or more processors; and
   a non-transitory memory communicatively coupled with and readable by the processing unit and comprising a sequence of instructions which, when executed by the one or more processors, causes the one or more processors to:
      receive data corresponding to one or more customer actions associated with one or more of a plurality of communication services provided by a communication services provider, wherein the received customer actions are associated with a first customer of a plurality of customers;
      retrieve a plurality of data metrics for the first customer via the one or more network interfaces, the data metrics retrieved from a plurality of source applications associated with the plurality of communication services provided by the communication services provider;
      execute one or more analytics processes to determine one or more correlations between the plurality of data metrics for the first customer, and the customer actions of the first customer associated with the communication services;
      based on the determined correlations, identify a first subset of the plurality of data metrics for the first customer corresponding to a compound service metric, the first subset of data metrics including at least a first data metric received from a first system associated with a first communication service, and a second data metric received from a second system associated with a second communication service;
      determine an associated weight value for each of the first subset of data metrics corresponding to the compound service metric for the first customer, wherein the weight values calculated for the first subset of data metrics are based on the determined correlations between the plurality of data metrics for the first customer and the customer actions of the first customer;
      generate the compound service metric for the first customer, using the identified first subset of the plurality of data metrics for the first customer, and the determined associated weight value for each of the first subset of data metrics;
      execute the compound service metric for the first customer to calculate a value, based on the retrieved data metrics corresponding to the first subset of data metrics associated with the first customer; and
      initiate a targeted intervention via one or more of the communication services to the first customer, based on the calculated value for the compound service metric for the first customer.

2. The system of claim 1, wherein the data metrics retrieved for the first customer are retrieved from one or more data stores including a first data store configured to implement a TM Forum Information Framework (SID) standard, wherein the first data store includes a third-normal form schema, and wherein the first data store is configured to receive and integrate data metrics from the plurality of source applications corresponding to the plurality of communication services.

3. The system of claim 1, further comprising:
   a network monitor device configured to monitor communication attempts and data transmissions for one or more of the communication services provided to the first customer, wherein at least one of the first subset of data metrics is based on data received from the network monitor device.

4. The system of claim 1, the non-transitory memory further comprising instructions which, when executed by the one or more processors, causes the one or more processors to:
   receive, from a client device via the one or more network interfaces, user input data identifying the first subset of data metrics corresponding to the compound service metric.

5. The system of claim 1, wherein the compound service metric calculated for the first customer comprises at least one of:
   a compound service customer sentiment metric based on first customer sentiment actions received from multiple of the plurality of communication services;
   a compound service customer value metric based on first customer value data received from multiple of the plurality of communication services; or
   a compound service customer resource usage metric based on first customer resource usage actions received from multiple of the plurality of different communication services.

6. The system of claim 1, wherein the compound service metric for the first customer is calculated based on:
   at least one data metric received from a first source application of a first computer system for a voice service provider;
   at least one data metric received from a second source application of a second computer system for a video service provider; and
   at least one data metric received from a third source application of a third computer system for an Internet service provider.

7. A method comprising:
   receiving, by a compound service metric generator, data corresponding to one or more customer actions associated with one or more of a plurality of communication services provided by a communication services provider, wherein the received customer actions are associated with a first customer of a plurality of customers;
   retrieving, by the compound service metric generator, a plurality of data metrics for the first customer, via one or more network interfaces, the data metrics retrieved from a plurality of source applications associated with the plurality of communication services provided by the communication services;

executing, by the compound service metric generator, one or more analytics processes to determine one or more correlations between the plurality of data metrics for the first customer, and the customer actions of the first customer associated with the communication services;

based on the determined correlations, identifying, by the compound service metric generator, a first subset of the plurality of data metrics for the first customer corresponding to a compound service metric, the first subset of data metrics including at least a first data metric received from a first system associated with a first communication service, and a second data metric received from a second system associated with a second communication service;

determining, by the compound service metric generator, an associated weight value for each of the first subset of data metrics corresponding to the compound service metric for the first customer, wherein the weight values calculated for the first subset of data metrics are based on the determined correlations between the plurality of data metrics for the first customer and the customer actions of the first customer;

generating, by the compound service metric generator, the compound service metric for the first customer, using the identified first subset of the plurality of data metrics for the first customer, and the determined associated weight value for each of the first subset of data metrics;

executing, by the compound service metric generator, the compound service metric for the first customer to calculate a value, based on the retrieved data metrics corresponding to the first subset of data metrics associated with the first customer; and initiating by the compound service metric generator, a targeted intervention via one or more of the communication services to the first customer, based on the calculated value for the compound service metric for the first customer.

8. The method of claim 7, wherein the data metrics retrieved for the first customer are retrieved from one or more data stores including a first data store configured to implement a TM Forum Information Framework (SID) standard, wherein the first data store includes a third-normal form schema, and wherein the first data store is configured to receive and integrate data metrics from the plurality of source applications corresponding to the plurality of communication services.

9. The method of claim 7, wherein at least one of the plurality of data metrics retrieved for the first customer are is-received from a network monitor device configured to monitor communication attempts and data transmissions for one or more of the communication services provided to the first customer.

10. The method of claim 7, further comprising:

receiving, from a client device via the one or more network interfaces, user input data identifying the first subset of data metrics corresponding to the compound service metric.

11. The method of claim 7, wherein the compound service metric calculated for the first customer comprises at least one of:

a compound service customer sentiment metric based on first customer sentiment actions received from multiple of the plurality of communication services;

a compound service customer value metric based on first customer value data received from multiple of the plurality of communication services; or a compound service customer resource usage metric based on first customer resource usage actions received from multiple of the plurality of different communication services.

12. The method of claim 1, wherein the compound service metric for the first customer is calculated based on:

at least one data metric received from a first source application of a first computer system for a voice service provider;

at least one data metric received from a second source application of a second computer system for a video service provider; and at least one data metric received from a third source application of a third computer system for an Internet service provider.

13. A non-transitory computer readable storage medium including instructions stored thereon which, when executed by a processor, cause the processor to:

receive data corresponding to one or more customer actions associated with one or more of a plurality of communication services provided by a communication services provider, wherein the received customer actions are associated with a first customer of a plurality of customers;

retrieve a plurality of data metrics for the first customer via one or more network interfaces, the data metrics retrieved from a plurality of source applications associated with the plurality of communication services provided by the communication services provider;

execute one or more analytics processes to determine one or more correlations between the plurality of data metrics for the first customer, and the customer actions of the first customer associated with the communication services;

based on the determined correlations, identify a first subset of the plurality of data metrics for the first customer corresponding to a compound service metric, the first subset of data metrics including at least a first data metric received from a first system associated with a first communication service, and a second data metric received from a second system associated with a second communication service;

determine an associated weight value for each of the first subset of data metrics corresponding to the compound service metric for the first customer, wherein the weight values calculated for the first subset of data metrics are based on the determined correlations between the plurality of data metrics for the first customer and the customer actions of the first customer;

generate the compound service metric for the first customer, using the identified first subset of the plurality of data metrics for the first customer, and the determined associated weight value for each of the first subset of data metrics;

execute the compound service metric for the first customer to calculate a value, based on the retrieved data metrics corresponding to the first subset of data metrics associated with the first customer; and initiate a targeted intervention via one or more of the communication services to the first customer, based on the calculated value for the compound service metric for the first customer.

14. The computer readable storage medium of claim 13, including further instructions stored thereon which, when executed by the processor, cause the processor to:
- receive, from a client device via the one or more network interfaces, user input data identifying the first subset of data metrics corresponding to the compound service metric.

15. The system of claim 1, the non-transitory memory further comprising instructions which, when executed by the one or more processors, causes the one or more processors to:
- receive additional data corresponding to customer actions with one or more of the plurality of communication services, wherein the received customer actions are associated with a second customer different from the first customer;
- retrieve a plurality of data metrics for the second customer via the one or more network interfaces, the data metrics retrieved from a plurality of source applications associated with the plurality of communication services provided by the communication services provider;
- execute the analytics processes to determine correlations between the plurality of data metrics for the second customer, and the customer actions of the second customer associated with the communication services;
- based on the determined correlations, identify a second subset of the plurality of data metrics for the second customer corresponding to a second compound service metric, wherein the second subset of data metrics is different from the first subset of data metrics determined for the first customer.

16. The method of claim 7, further comprising:
- receiving additional data corresponding to customer actions with one or more of the plurality of communication services, wherein the received customer actions are associated with a second customer different from the first customer;
- retrieving a plurality of data metrics for the second customer via the one or more network interfaces, the data metrics retrieved from a plurality of source applications associated with the plurality of communication services provided by the communication services provider;
- executing the analytics processes to determine correlations between the plurality of data metrics for the second customer, and the customer actions of the second customer associated with the communication services;
- based on the determined correlations, identifying a second subset of the plurality of data metrics for the second customer corresponding to a second compound service metric, wherein the second subset of data metrics is different from the first subset of data metrics determined for the first customer.

17. The computer readable storage medium of claim 13, including further instructions stored thereon which, when executed by the processor, cause the processor to:
- receive additional data corresponding to customer actions with one or more of the plurality of communication services, wherein the received customer actions are associated with a second customer different from the first customer;
- retrieve a plurality of data metrics for the second customer via the one or more network interfaces, the data metrics retrieved from a plurality of source applications associated with the plurality of communication services provided by the communication services provider;
- execute the analytics processes to determine correlations between the plurality of data metrics for the second customer, and the customer actions of the second customer associated with the communication services;
- based on the determined correlations, identify a second subset of the plurality of data metrics for the second customer corresponding to a second compound service metric, wherein the second subset of data metrics is different from the first subset of data metrics determined for the first customer.

18. The system of claim 1, wherein initiating the targeted intervention to the first customer comprises re-routing a customer service ticket associated with the first customer during a support session associated with the first customer.

19. The method of claim 7, wherein initiating the targeted intervention to the first customer comprises re-routing a customer service ticket associated with the first customer during a support session associated with the first customer.

20. The computer readable storage medium of claim 13, wherein initiating the targeted intervention to the first customer comprises re-routing a customer service ticket associated with the first customer during a support session associated with the first customer.

\* \* \* \* \*

UNITED STATES PATENT AND TRADEMARK OFFICE
CERTIFICATE OF CORRECTION

PATENT NO. : 10,230,592 B2  
APPLICATION NO. : 15/059038  
DATED : March 12, 2019  
INVENTOR(S) : Scholz Page 1 of 1

It is certified that error appears in the above-identified patent and that said Letters Patent is hereby corrected as shown below:

In the Claims

In Column 35, Line 37, in Claim 7, delete "initiating" and insert -- initiating, --, therefor.

In Column 35, Line 53, in Claim 9, delete "is-received" and insert -- received --, therefor.

In Column 36, Line 8, in Claim 12, delete "claim 1" and insert -- claim 7 --, therefor.

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*